(12) United States Patent
Satou et al.

(10) Patent No.: US 12,103,376 B2
(45) Date of Patent: Oct. 1, 2024

(54) AUTOMOBILE

(71) Applicant: Nissan Motor Co., Ltd., Kanagawa (JP)

(72) Inventors: Yutaka Satou, Kanagawa (JP); Yoichi Yamamoto, Kanagawa (JP); Hiroki Yonekawa, Kanagawa (JP); Takuya Yamashita, Kanagawa (JP); Shinya Akizuki, Kanagawa (JP); Yuuji Okamoto, Kanagawa (JP); Yuusuke Handa, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 322 days.

(21) Appl. No.: 17/754,704

(22) PCT Filed: Oct. 9, 2019

(86) PCT No.: PCT/JP2019/039843
§ 371 (c)(1),
(2) Date: Apr. 8, 2022

(87) PCT Pub. No.: WO2021/070288
PCT Pub. Date: Apr. 15, 2021

(65) Prior Publication Data
US 2023/0249533 A1 Aug. 10, 2023

(51) Int. Cl.
*B60K 1/04* (2019.01)
*B62D 25/20* (2006.01)

(52) U.S. Cl.
CPC ............ *B60K 1/04* (2013.01); *B62D 25/2027* (2013.01); *B62D 25/2036* (2013.01); *B60K 2001/0438* (2013.01); *B60Y 2400/86* (2013.01)

(58) Field of Classification Search
CPC ............... B62D 21/15; B62D 25/2036; B60K 2001/0416; B60K 2001/0438
See application file for complete search history.

(56) References Cited

U.S. PATENT DOCUMENTS

| | | | | |
|---|---|---|---|---|
| 8,608,230 | B2 * | 12/2013 | Young ................. | B62D 21/157 296/187.02 |
| 8,833,839 | B2 * | 9/2014 | Young ................. | B62D 25/025 296/187.08 |
| 8,863,877 | B2 * | 10/2014 | Saeki ................. | H01M 50/249 180/274 |

(Continued)

FOREIGN PATENT DOCUMENTS

| | | |
|---|---|---|
| JP | 2004-161158 A | 6/2004 |
| JP | 2017-222332 A | 12/2017 |
| JP | 2019-156029 A | 9/2019 |

*Primary Examiner* — Jeffrey J Restifo
(74) *Attorney, Agent, or Firm* — Osha Bergman Watanabe & Burton LLP

(57) ABSTRACT

There are provided a battery frame that is attached to a structural member on a floor back of an automobile body and accommodates a battery, and a rear suspension member assembly that is attached to rear floor side members and supports a rear suspension. The rear suspension member assembly is attached to the rear floor side members at least at right and left front-side attachment parts and right and left rear-side attachment parts. The rear suspension member assembly is attached to the battery frame at a first attachment part that is closer to a vehicle front than the right and left front-side attachment parts.

5 Claims, 12 Drawing Sheets

(56) References Cited

U.S. PATENT DOCUMENTS

| | | | | |
|---|---|---|---|---|
| 8,863,878 | B2* | 10/2014 | Shirooka | B60K 1/04 |
| | | | | 180/68.5 |
| 9,937,781 | B1* | 4/2018 | Bryer | B62D 35/02 |
| 10,589,790 | B2* | 3/2020 | Ayukawa | B62D 21/152 |
| 10,597,081 | B2* | 3/2020 | Ayukawa | B62D 25/2018 |
| 10,661,841 | B2* | 5/2020 | Choi | B62D 29/002 |
| 10,766,348 | B2* | 9/2020 | Fukui | B62D 21/09 |
| 10,773,583 | B2* | 9/2020 | Fukui | B60K 1/04 |
| 10,829,156 | B2* | 11/2020 | Otoguro | B62D 25/20 |
| 10,843,545 | B2* | 11/2020 | Grace | B60L 50/64 |
| 10,882,557 | B2* | 1/2021 | Otoguro | B60K 1/04 |
| 10,967,722 | B2* | 4/2021 | Tanaka | B60L 50/64 |
| 11,110,785 | B2* | 9/2021 | Koike | B60K 1/04 |
| 11,565,578 | B2* | 1/2023 | Shimizu | B60K 1/04 |
| 11,753,077 | B2* | 9/2023 | Kellner | B62D 29/008 |
| | | | | 180/291 |
| 2019/0276080 | A1* | 9/2019 | Otoguro | B60K 1/04 |
| 2022/0320659 | A1* | 10/2022 | Munjurulimana | H01M 50/249 |
| 2023/0249533 | A1* | 8/2023 | Satou | B60K 1/04 |
| | | | | 180/68.5 |
| 2023/0264561 | A1* | 8/2023 | Kamemoto | B62D 25/20 |
| | | | | 180/312 |
| 2023/0264752 | A1* | 8/2023 | Kamemoto | B60K 1/04 |
| | | | | 296/203.01 |
| 2023/0303176 | A1* | 9/2023 | Oguri | B62D 25/20 |
| 2024/0034141 | A1* | 2/2024 | Yoshida | B62D 21/152 |
| 2024/0109591 | A1* | 4/2024 | Inazumi | B62D 21/155 |

* cited by examiner

AUTOMOBILE

TECHNICAL FIELD

The present invention relates to an automobile and particularly to an attachment structure for the rear suspension members of an automobile having a floor back on which a battery is mounted.

BACKGROUND ART

An automobile is known in which a battery is mounted on the floor back of the rear floor of an automobile body and behind the rear suspension (Patent Document 1).

PRIOR ART DOCUMENT

Patent Document

[Patent Document 1] JP2004-161158A

SUMMARY OF INVENTION

Problems to be Solved by Invention

Unfortunately, when it is desired to further increase the battery capacity in order to extend the cruising distance, the storage space will be insufficient only behind the rear suspension on the rear floor as in the above prior art. However, if the battery is mounted in front of the rear suspension, there will be a problem in that the battery interferes with the attachment positions of the rear suspension members.

A problem to be solved by the present invention is to provide an automobile in which a battery can be mounted in front of the rear suspension without interfering with the rear suspension members.

Means for Solving Problems

The present invention solves the above problem through attaching right and left front-side attachment parts and right and left rear-side attachment parts of a rear suspension member assembly to rear floor side members and further attaching a first attachment part, which is closer to the vehicle front than the right and left front-side attachment parts, to a battery frame.

Effect of Invention

According to the present invention, the battery frame is robust because it is attached to the structural member on the floor back of the automobile body, and can therefore sufficiently support the rear suspension member assembly, and the steering stability can be maintained. On the other hand, by attaching the first attachment part on the front of the rear suspension member assembly to the battery frame, the battery frame can be expanded rearward to the position of the rear suspension. As a result, the battery can be mounted in front of the rear suspension without interfering with the rear suspension members.

MODE(S) FOR CARRYING OUT THE INVENTION

Figure 1:
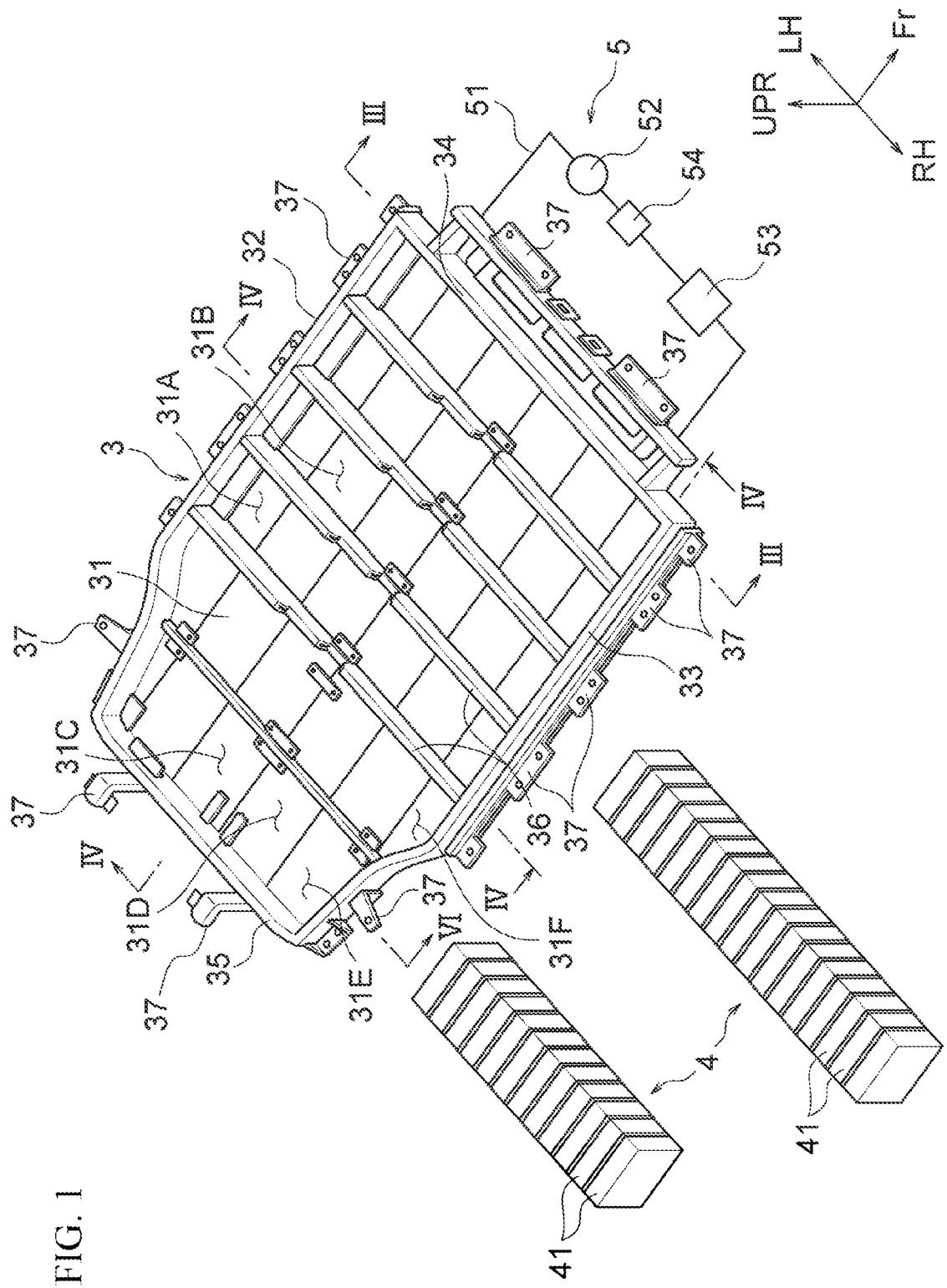
FIG. 1 is a perspective view illustrating a battery frame attached to an automobile according to the present invention.
Figure 2:
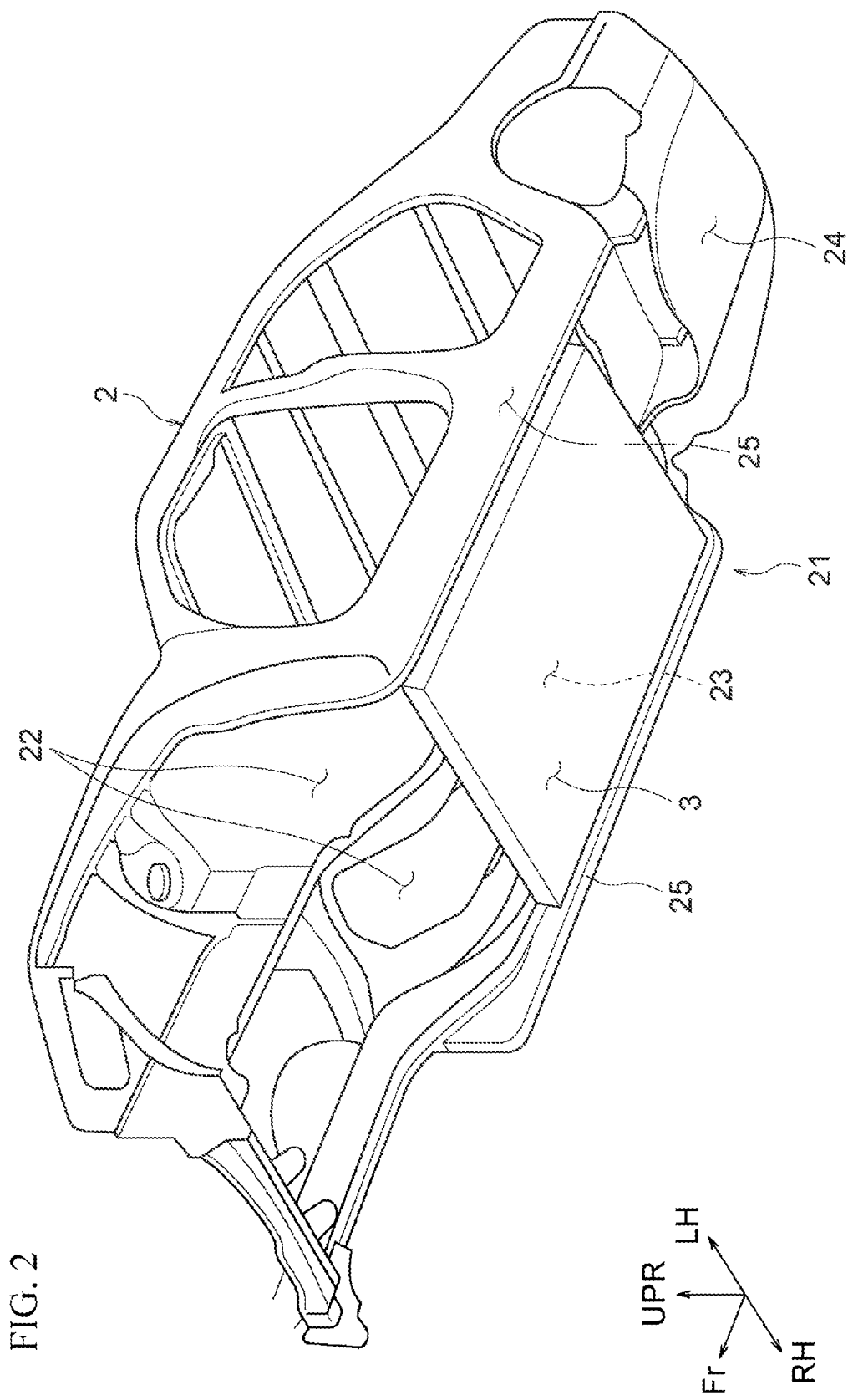
FIG. 2 is a perspective view illustrating a state in which the battery frame of FIG. 1 is attached to the floor back of an automobile body.
Figure 3:
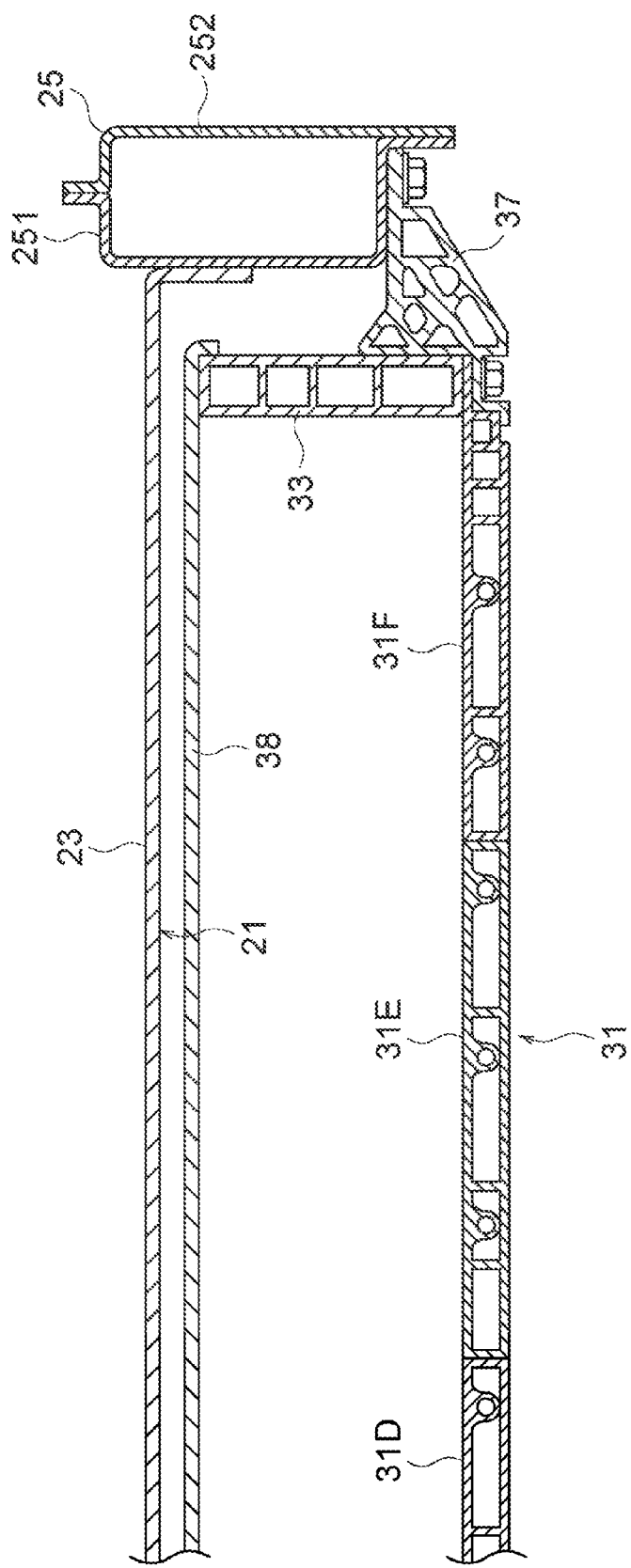
FIG. 3 is a cross-sectional view taken along the line III-III of FIG. 1.
Figure 5:
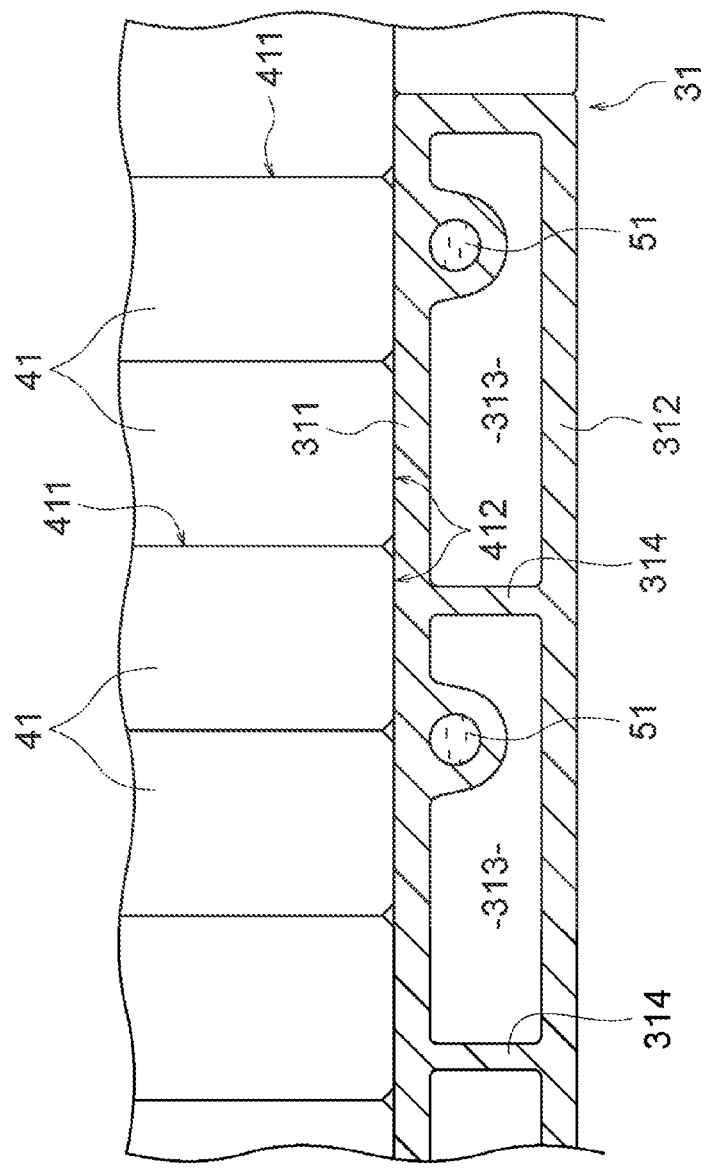
FIG. 5 is an enlarged cross-sectional view illustrating the main part of a bottom frame of FIG. 3.
Figure 6:
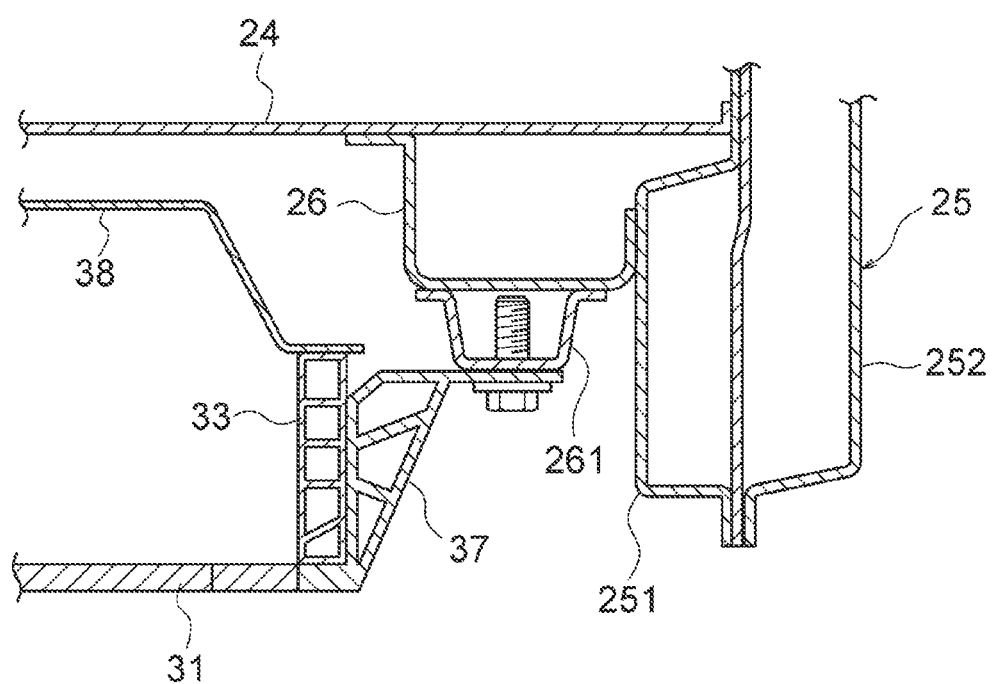
FIG. 6 is a cross-sectional view taken along the line VI-VI of FIG. 1.

Hereinafter, one or more embodiments of the present invention will be described with reference to the drawings. FIG. 1 is a perspective view illustrating a battery frame that constitutes a cooling device for onboard batteries according to the present invention, FIG. 2 is a perspective view illustrating a state in which the battery frame of FIG. 1 is attached to the floor back of an automobile body, FIG. 3 is a cross-sectional view taken along the line III-III of FIG. 1, FIG. 4 is a cross-sectional view taken along the line IV-IV of FIG. 1, FIG. 5 is an enlarged cross-sectional view illustrating the main part of a bottom frame of FIG. 3, and FIG. 6 is a cross-sectional view taken along the line VI-VI of FIG. 1.

Automobile 1 according to an embodiment of the present invention comprises: a battery frame 3 that is attached to the structural member on a floor back of an automobile body 2 and accommodates batteries 4; and a rear suspension member assembly 61 that is attached to rear floor side members 26 and supports a rear suspension 6.

As illustrated in FIG. 1, the battery frame 3 includes a plate-shaped bottom frame 31 and a plurality of plate-shaped side frames 32, 33, 34, and 35 that are fixed to the outer peripheral portion of the bottom frame 31. The side frames 32 to 35 of the present embodiment are composed of four members, but are not limited to this and may be composed of less than four or five or more side frames. The bottom frame 31 and the side frames 32 to 35 are not particularly limited, but can be composed of extruded aluminum products. When composed of extruded aluminum products, the bottom frame 31 and the side frames 32 to 35 are excellent in the heat transfer, weight reduction, and noise shielding.

Figure 4:
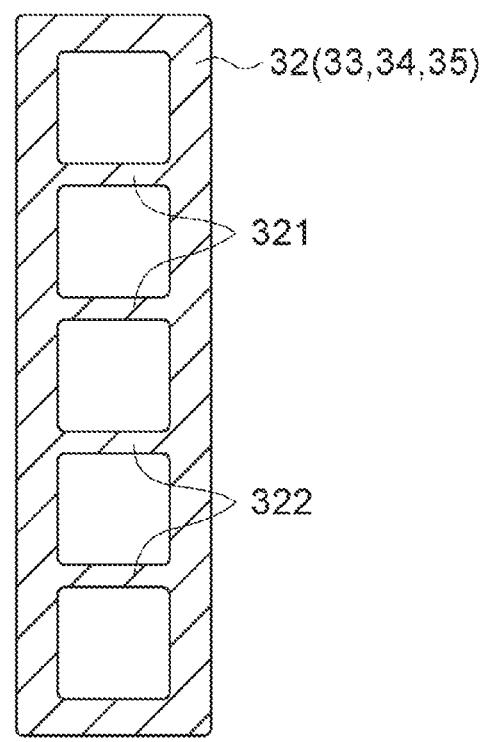
FIG. 4 is a cross-sectional view taken along the line IV-IV of FIG. 1.

FIG. 4 is a cross-sectional view taken along the line IV-IV of FIG. 1 and illustrates a longitudinal cross section of the right and left side frames 32 and 33 and front and rear side frames 34 and 35 of the battery frame 3. As illustrated in the figure, the four side frames 32 to 35 are basically formed into the same hollow cross-sectional structures partially having ribs 321. By forming the side frames 32 to 35 into the hollow cross-sectional structures partially having the ribs 321, it is possible to ensure a certain strength while reducing the weight.

The bottom frame 31 is formed into one flat plate by welding and joining six sub-bottom frames 31A to 31F that are divided by dividing lines along the front-rear direction of the automobile body 2. That is, one sub-bottom frame is composed of one extruded product from the front end to the rear end of the bottom frame 31. As illustrated in FIG. 5, the bottom frame 31 is formed into a hollow cross-sectional structure partially having ribs 314. More specifically, the bottom frame 31 is a hollow plate-shaped frame having an upper plate 311, a lower plate 312 that faces the upper plate 311 via hollow portions 313, and ribs 314 that connect the upper plate 311 and the lower plate 312 in the hollow portions 313.

As illustrated in FIG. 5, particularly in the bottom frame 31 of the present embodiment, a part of a flow path 51 of a refrigerant circulator 5 is provided at a position of each hollow portion 313 in contact with the upper plate 311. FIG. 5 is an enlarged cross-sectional view illustrating a main part of the bottom frame 31. The cross-sectional structure is as illustrated in FIG. 5 from the front end to the rear end of the bottom frame 31 because the bottom frame 31 is composed of an extruded product. Therefore the flow path 51 is also formed from the front end to the rear end of the bottom frame 31. By providing the flow path 51 at a position of each hollow portion 313 in contact with the upper plate 311, the cooling heat of the liquid refrigerant flowing through the flow path 51 can be easily transferred to the upper plate 311. On the other hand, by interposing the air in the hollow portion 313 so that the flow path 51 is not in contact with the lower plate 312, the cooling heat of the liquid refrigerant can be prevented from escaping from the lower plate 312.

The battery frame 3 illustrated in FIG. 1 is configured such that the four side frames 32 to 35 are fixed to the outer peripheral portion of the bottom frame 31 by welding or the like, and the batteries 4 are housed in a space surrounded by the bottom frame 31, a floor back surface 21 of the automobile body 2 facing the bottom frame 31, and the four side frames 32 to 35 in a state in which the batteries 4 are in contact with the bottom frame 31 and at least one of the side surface frames 32 to 35. Reference numeral 36 illustrated in FIG. 1 represents partition plates fixed to the upper surface of the bottom frame 31 by welding or the like.

Each battery 4 (also referred to as an assembled battery) includes a plurality of battery modules 41, and each battery module is housed in a rectangular parallelepiped module case. Although not illustrated, a plurality of thin cells (also referred to as single cells) is housed inside each module case in a stacked state. In the present embodiment, the plurality of battery modules 41 is arranged and fixed side by side on the surface of the bottom frame 31 so that respective main surfaces 411 of the plurality of battery modules 41 are perpendicular to the surface of the bottom frame 31.

In other words, the plurality of battery modules 41 is arranged and fixed side by side on the surface of the bottom frame 31 so that respective side surfaces 412 of the plurality of battery modules 41 are in contact with the surface of the bottom frame 31. By arranging the plurality of battery modules 41 longitudinally in this way, all the battery modules 41 can be in contact with the bottom frame 31 and can thus be cooled evenly.

As illustrated in FIG. 2, the battery frame 3 of the present embodiment is attached over almost the entire surface of a range from the front portion of a front floor panel 23 to a rear floor panel 24 on the floor back surface 21 of the automobile body 2. Reference numeral 22 represents a dash panel, and reference numeral 25 represents sills. In the battery frame 3 of the present embodiment, as illustrated in FIG. 1, the batteries 4 illustrated in the lower left of the figure are mounted in the five compartments from the front which are partitioned by partition plates 36, and the battery 4 in which a smaller number of the battery modules 41 are arranged is mounted in the rearmost compartment which is partitioned by a partition plate 36.

As illustrated in FIG. 1, the refrigerant circulator 5 of the present embodiment includes the flow path 51 through which a liquid refrigerant flows, a pump 52 that allows the liquid refrigerant to flow, a cooler 53 that cools the liquid refrigerant, and a refrigerant tank 54. An antifreeze liquid (long life coolant LLC) or the like containing ethylene glycol as the main component can be used as the liquid refrigerant of the present embodiment. Although not illustrated, the cooler 53 cools the liquid refrigerant composed of an antifreeze liquid by exchanging heat with a refrigerant in the cooling cycle of an air conditioner device for automobiles that is equipped in the automobile.

The battery frame 3 configured in this way is attached to the floor back surface 21 of the automobile body 2 by using a plurality of brackets 37 as illustrated in FIG. 3 after closing the upper surface with a cover 38. Specifically, as illustrated in FIG. 3, the right and left sides of the battery frame 3 are each attached to a sill inner panel 251 or a sill outer panel 252 of the sills 25 which are structural members of the automobile body 2.

As illustrated in FIG. 6, the rear end portion of the battery frame 3 is attached to brackets 261 of the rear floor side members 26 which are structural members of the automobile body 2 by using brackets 37. Likewise, the front end side of the battery frame 3 is directly or indirectly attached to the structural member of the front floor panel. Thus, the battery frame 3 itself is a robust body fixed to the floor back surface 21 of the automobile body 2 because the entire six surfaces of the battery frame 3 are mechanically fixed by the bottom frame 31, the side frames 32 to 35, and the cover 38.

The description will then be directed to the rear suspension member assembly 61 which supports the rear suspension 6. Although details of the rear suspension 6 are not illustrated, the rear suspension 6 is a suspension device comprising: suspension arms that support the rear wheels; coil springs; and shock absorbers (dampers). The rear suspension 6 may further comprise torsion bars and lateral rods as necessary. In the side view of FIG. 10, one of the shock absorbers is illustrated as the rear suspension 6. The automobile 1 according to the present invention is not particularly limited to the type of the rear suspension 6, and various types of rear suspension can be applied.

The rear suspension 6 is supported by the rear suspension member assembly 61, which is attached to the rear floor side members 26. The rear floor side members 26, which are structural members of the automobile body 2, are fixed to the right and left side portions of the floor back of the rear floor panel 24 by welding or the like so as to extend from the front end to the rear end.

Figure 7:
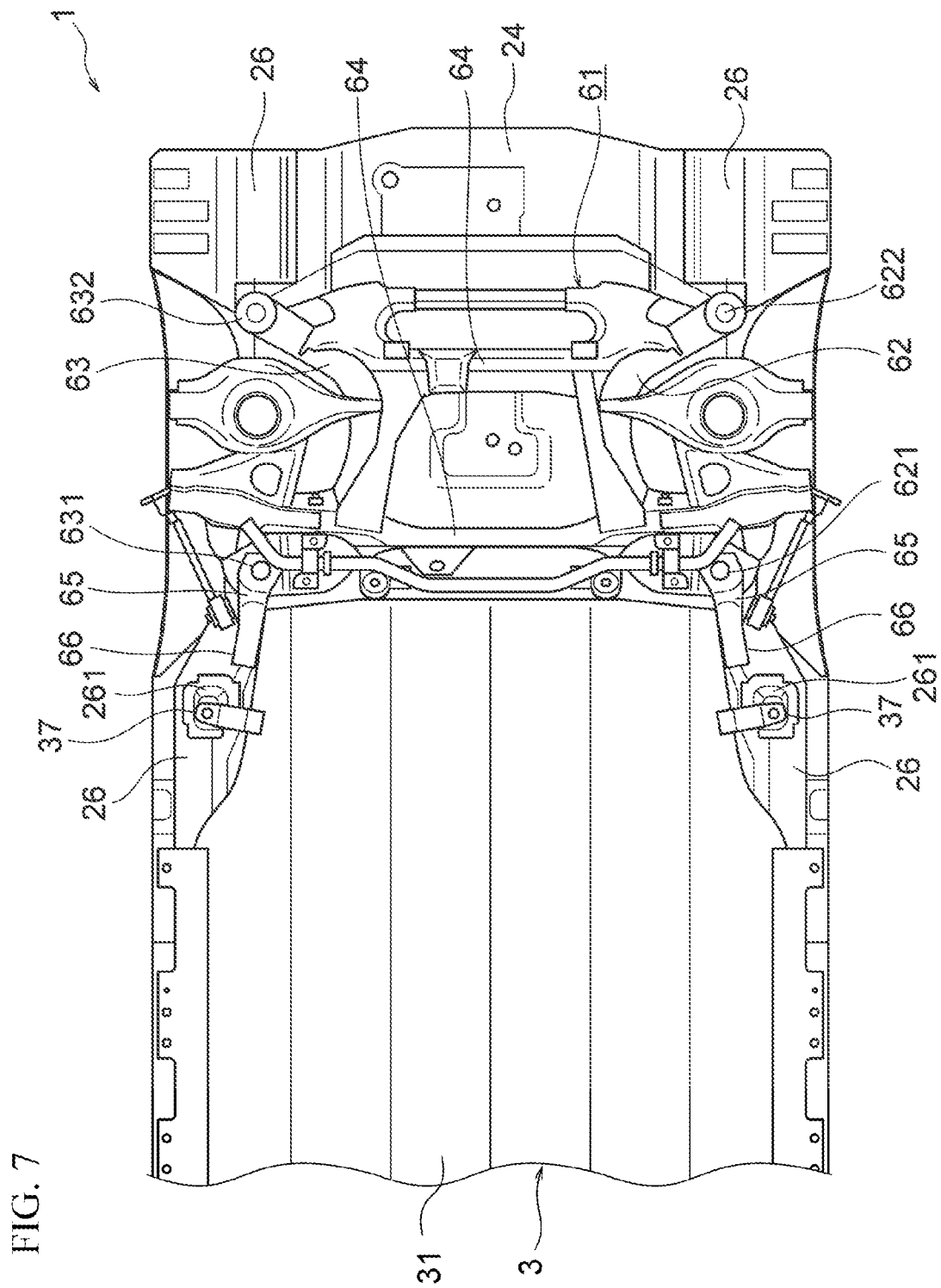
FIG. 7 is a bottom view illustrating a floor back including the battery frame and rear suspension of the automobile according to the present invention.
Figure 8:
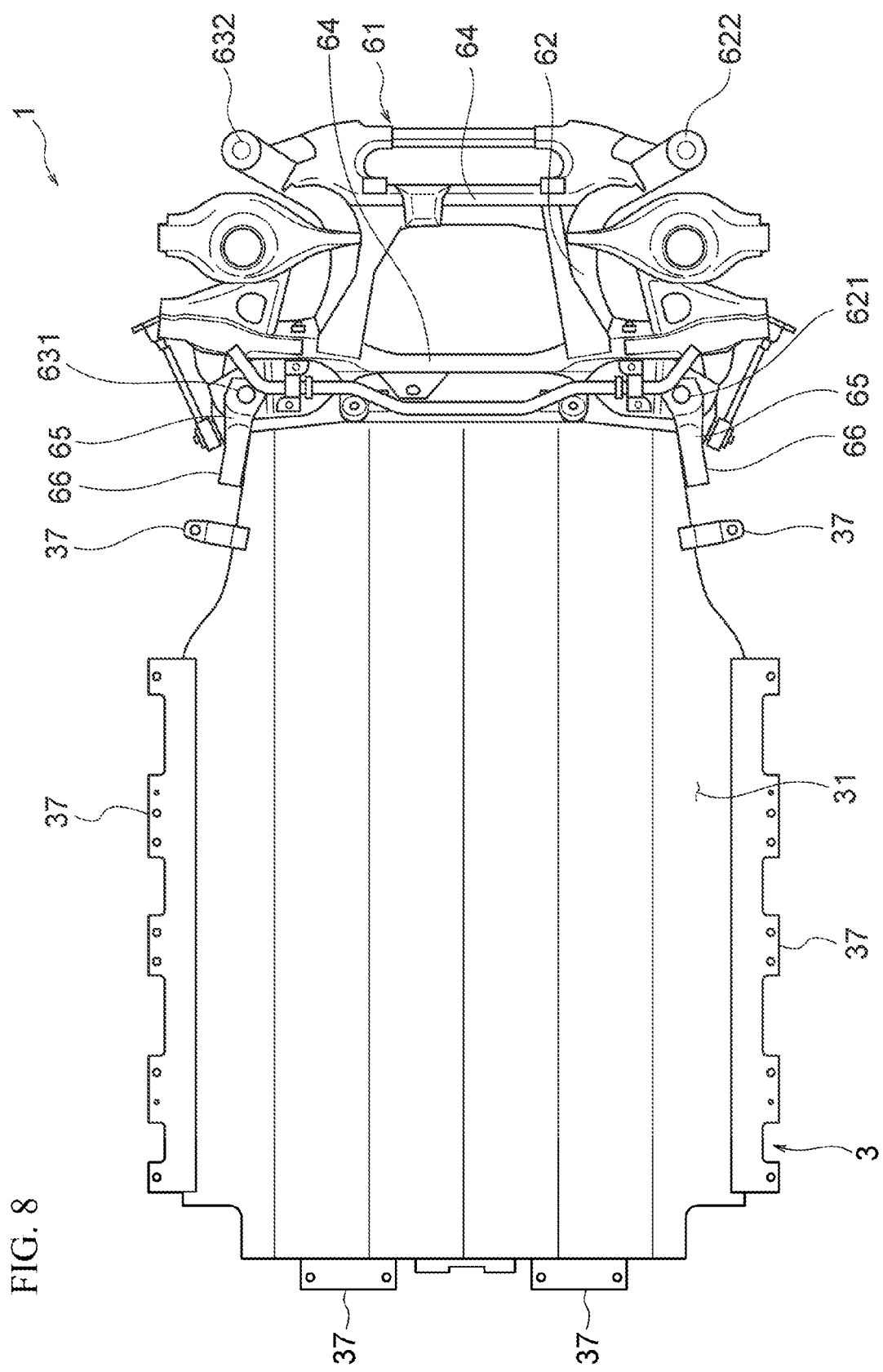
FIG. 8 is a bottom view illustrating the battery frame and rear suspension of the automobile according to the present invention.
Figure 9:
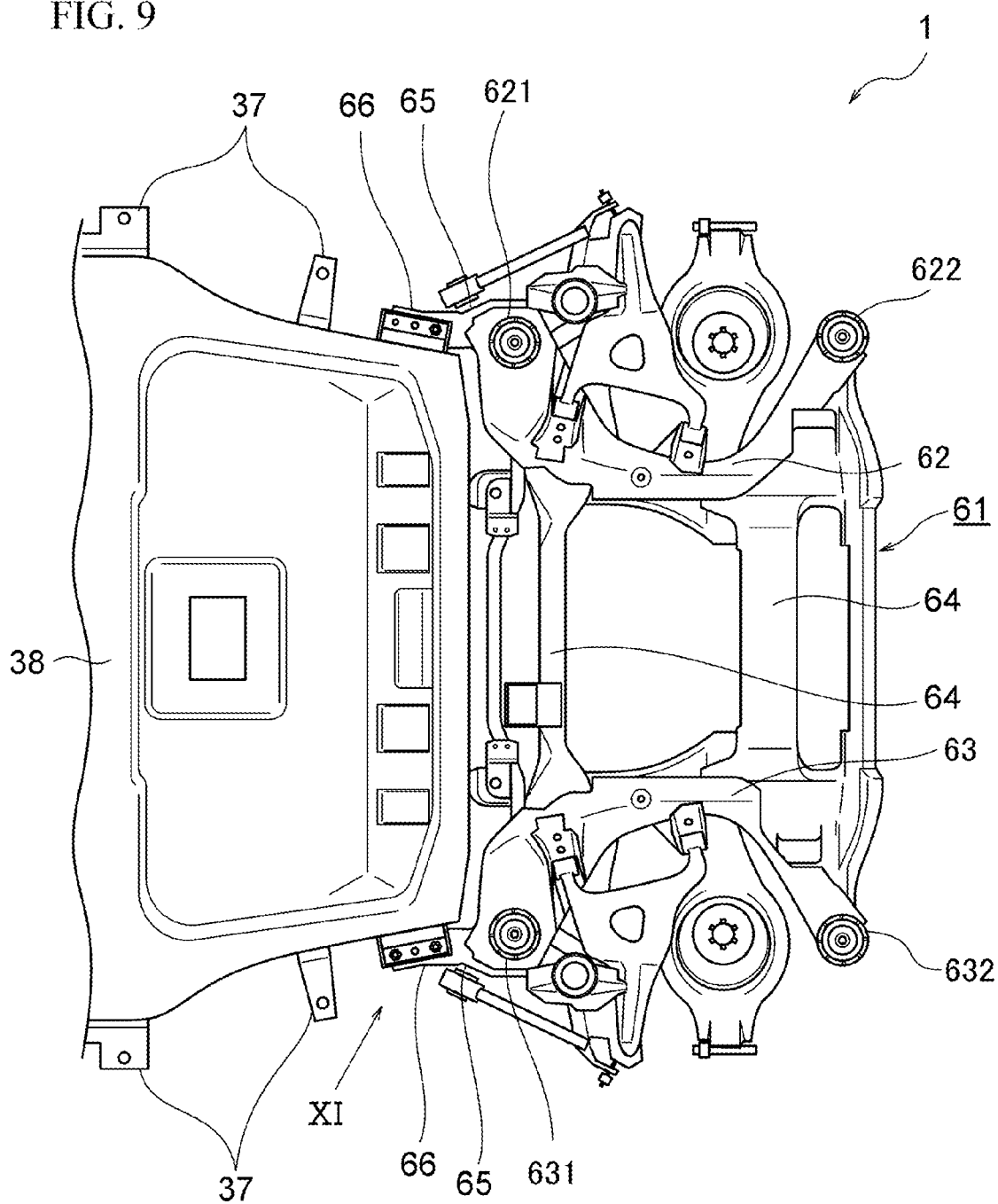
FIG. 9 is a plan view illustrating the battery frame and rear suspension of the automobile according to the present invention.
Figure 10:
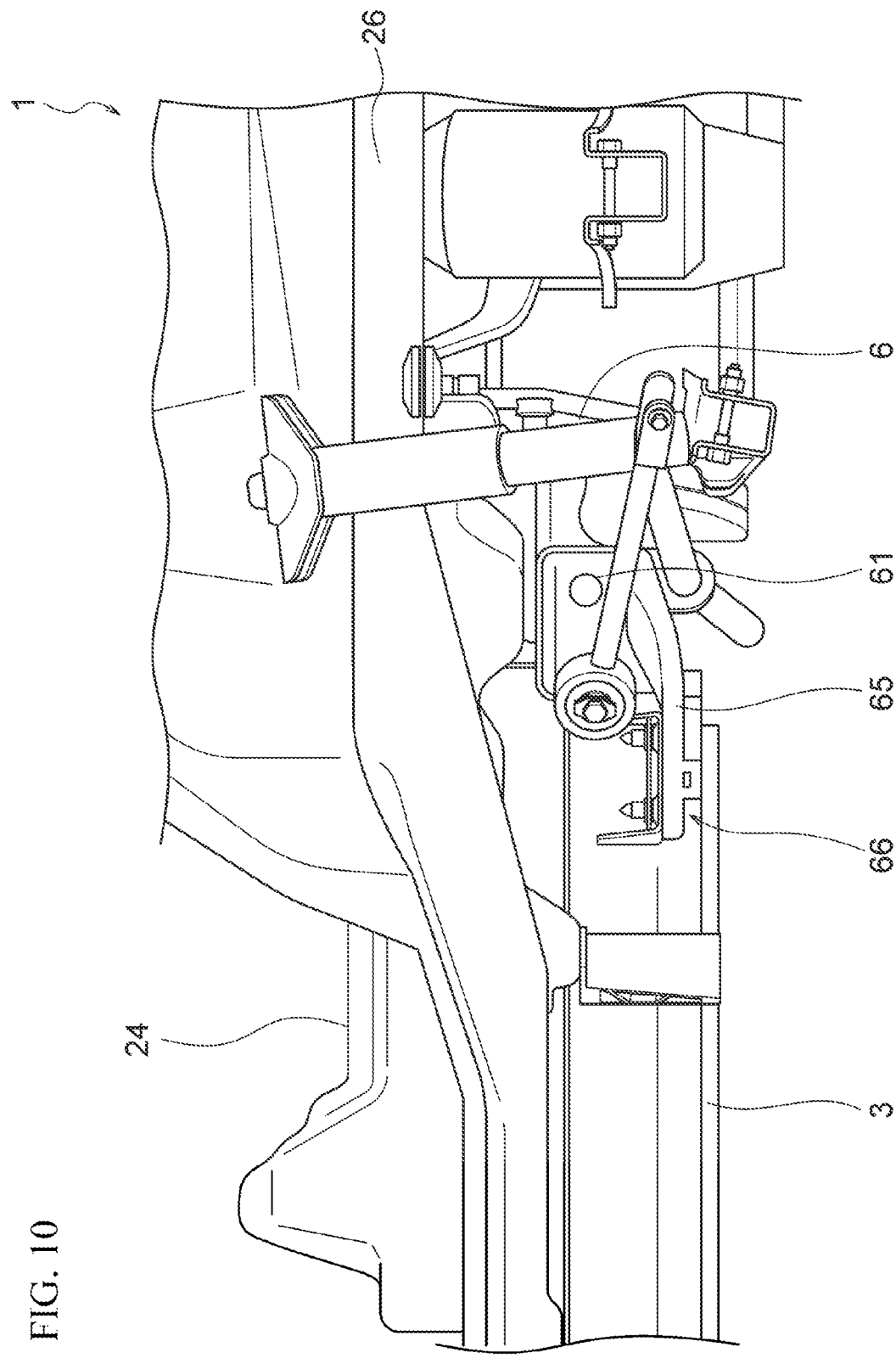
FIG. 10 is a side view illustrating the battery frame and rear suspension of the automobile according to the present invention.
Figure 11:
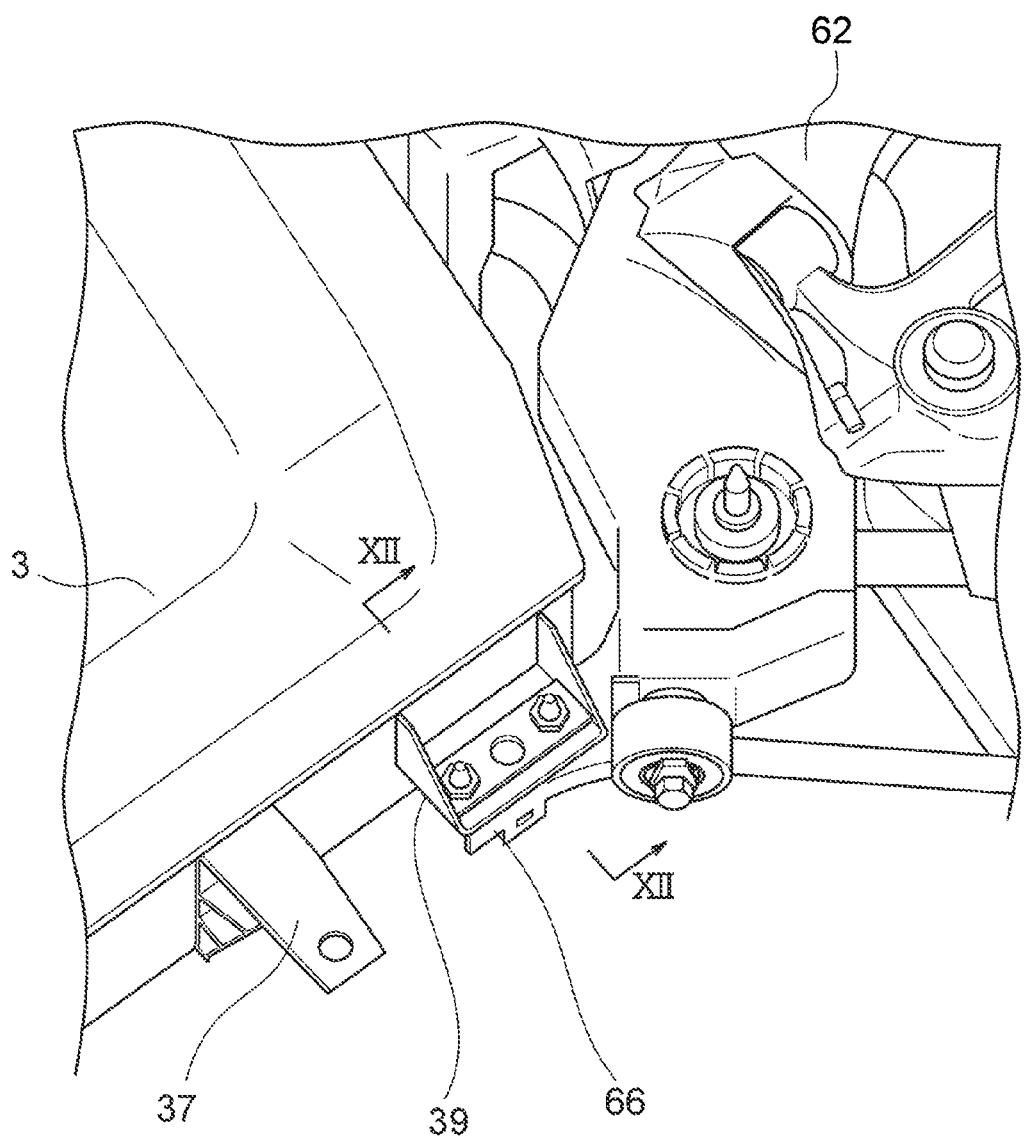
FIG. 11 is a fragmentary view taken in the direction of the arrow XI of FIG. 9.
Figure 12:
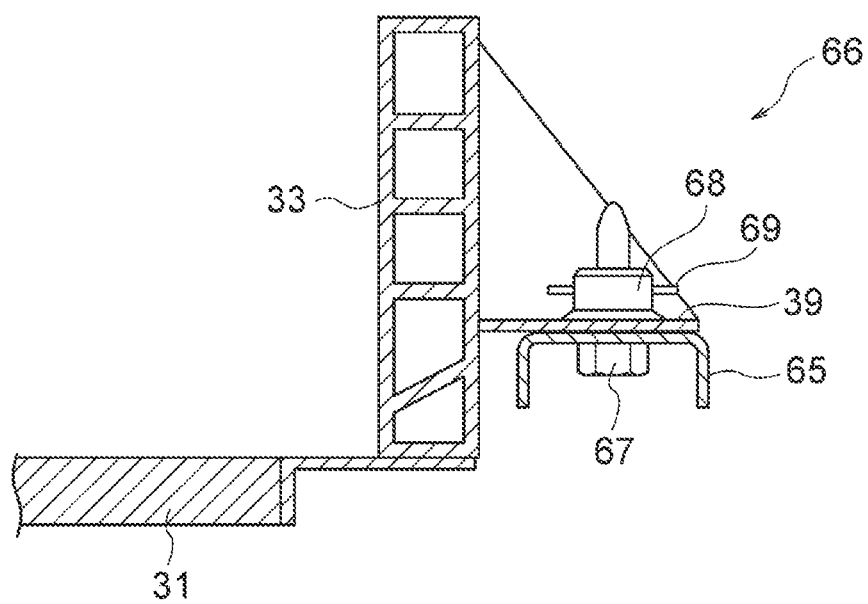
FIG. 12 is a cross-sectional view taken along the line XII-XII of FIG. 11.

FIG. 7 is a bottom view illustrating the floor back including the battery frame and rear suspension of the automobile according to the present invention, FIG. 8 is a bottom view illustrating the battery frame and rear suspension of FIG. 7 extracted, FIG. 9 is a plan view illustrating the battery frame and rear suspension of FIG. 7 extracted, FIG. 10 is a side view illustrating the battery frame and rear suspension of the automobile according to the present invention, FIG. 11 is a fragmentary view taken in the direction of the arrow XI of FIG. 9, and FIG. 12 is a cross-sectional view taken along the line XII-XII of FIG. 11.

The rear suspension member assembly 61 is a structural member formed by joining a plurality of pressed steel sheets by welding or the like. As illustrated in the plan view of FIG. 9, the rear suspension member assembly 61 includes a first rear suspension member 62 that is formed by being curved so as to suspend a front-side attachment part 621 and a rear-side attachment part 622 on the left side, a second rear suspension member 63 that is formed by being curved so as to suspend a front-side attachment part 631 and a rear-side attachment part 632 on the right side, and two third rear suspension members 64 and 64 that suspend the first rear suspension member 62 and the second rear suspension member 63 respectively at the front and rear of the vehicle.

The rear suspension member assembly 61 is attached to the rear floor side members 26 at the right and left front-side attachment parts 621 and 631 and the right and left rear-side attachment parts 622 and 632. In this case, insulators (not illustrated) or the like are interposed between the right and left front-side attachment parts 621 and 631 and the rear floor side members 26 and between the right and left rear-side attachment parts 622 and 632 and the rear floor side members 26.

In addition, pin stay panels 65 extending toward the front of the vehicle are fixed to the front portion of the first rear suspension member 62 and the front portion of the second rear suspension member 63. The pin stay panels 65, which are components obtained by pressing steel sheets, are provided as separate members from the first rear suspension member 62 and the second rear suspension member 63 and constitute first vulnerable parts of the rear suspension member assembly 61. The pin stay panels 65 of the rear suspension member assembly 61 are therefore designed to have a strength to buckle first in the event of a rear collision.

In the rear suspension member assembly 61 of the present embodiment, first attachment parts 66 are provided at the tips of the pin stay panels 65. The first attachment parts 66 are located closer to the vehicle front than the right and left front-side attachment parts 621 and 631, and the rear suspension member assembly 61 is attached to the battery frame 3 at the first attachment parts 66.

That is, as illustrated in FIGS. 11 and 12, the tip portion of each pin stay panel 65 is formed with a bolt hole (not illustrated) through which a bolt 67 is inserted. On the other hand, a bracket 39 formed with a bolt hole (not illustrated) through which the bolt 67 is inserted in the same manner as above is fixed to each of the right and left sides of the rear portion of the battery frame 3 by welding or the like. The bolt hole of the pin stay panel 65 and the bolt hole of the bracket 39 are formed at corresponding positions so that the bolt 67 can be inserted. As illustrated in the figures, the first attachment part 66 at the tip of the pin stay panel 65 is attached to the bracket 39 of the battery frame 3 by using the bolt 67 and a nut 68. Reference numeral 69 represents a nut plate that prevents the nut 68 from rotating together with the bolt 67 when the bolt 67 is tightened.

The bolt 67 of the present embodiment is designed to have a strength to constitute a vulnerable part of the rear suspension member assembly 61 next to the pin stay panel 65. That is, in the rear suspension member assembly 61, the bolt 67 is designed to have a strength to buckle next to the pin stay panel 65 in the event of a rear collision.

In the automobile of the present embodiment, the rear suspension member assembly 61 is attached to the rear floor side members 26 at four points of the right and left front-side attachment parts 621 and 631 and the right and left rear-side attachment parts 622 and 632. In addition to this, the first attachment parts 66 provided closer to the front than the right and left front-side attachment parts 621 and 631 are attached to the right and left rear end portions of the battery frame 3, and the rear suspension member assembly 61 is thus attached to the automobile body 2 at six points.

As described above, according to the automobile 1 of the present embodiment, the battery frame 3 and the rear suspension member assembly 61 are provided in the automobile 1. The battery frame 3 is attached to the sills 25, the rear floor side members 26, and the like, which are structural members on the floor back surface 21 of the automobile body 2, and accommodates the batteries 4. The rear suspension member assembly 61 is attached to the rear floor side members 26 and supports the rear suspension 6. The rear suspension member assembly 61 is attached to the rear floor side members 26 at least at the right and left front-side attachment parts 621 and 631 and the right and left rear-side attachment parts 622 and 632. The rear suspension member assembly 61 is attached to the battery frame 3 at the first attachment parts 66 which are closer to the vehicle front than the right and left front-side attachment parts 621 and 631.

The battery frame 3 itself is a robust body fixed to the floor back surface 21 of the automobile body 2 because the entire six surfaces of the battery frame 3 are mechanically fixed by the bottom frame 31, the side frames 32 to 35, and the cover 38. Therefore, even when the right and left front ends of the rear suspension member assembly 61 are not attached to the automobile body 2 via sub-frames as separate components, the battery frame 3 has the same strength as that of this type of sub-frames, and it is thus possible to reduce the weight by reducing the number of components without impairing the steering stability. In addition to this, by attaching the first attachment parts at the front of the rear suspension member assembly to the battery frame, the battery frame can be expanded rearward to the position of the rear suspension. As a result, the batteries can be mounted in front of the rear suspension without interfering with the rear suspension members.

Moreover, according to the automobile 1 of the present embodiment, the battery frame 3 has right and left side portions that are attached to the sills 25 of the automobile body 2 and right and left rear end portions that are attached to the rear floor side members 26, and the first attachment parts 66 of the rear suspension member assembly 61 are attached to the right and left rear end portions of the battery frame 3. That is, the battery frame 3 itself is a robust body fixed to the floor back surface 21 of the automobile body 2 because the entire six surfaces of the battery frame 3 are mechanically fixed by the bottom frame 31, the side frames 32 to 35, and the cover 38. It is therefore possible to reduce the weight by reducing the number of components without impairing the steering stability. In addition to this, the batteries can be mounted in front of the rear suspension without interfering with the rear suspension members.

Furthermore, according to the automobile 1 of the present embodiment, the rear suspension member assembly 61 includes the first rear suspension member 62 that suspends the front-side attachment part 621 and the rear-side attachment part 631 on the left side, the second rear suspension member 63 that suspends the front-side attachment part 631 and the rear-side attachment part 632 on the right side, and the third rear suspension members 64 and 64 that suspend the first rear suspension member 62 and the second rear suspension member 62, the first attachment parts 66 are provided on the pin stay panels 65 extending toward the vehicle front from respective front portions of the first rear suspension member 62 and the second rear suspension member 63, and the first attachment parts 66 are attached via the bolts 67 and the nuts 68 to the brackets 39 fixed to the right and left rear end portions of the battery frame 3. Through this configuration, it is possible to reduce the weight by reducing the number of components without impairing the steering stability. In addition to this, the batteries can be mounted in front of the rear suspension without interfering with the rear suspension members.

Moreover, according to the automobile 1 of the present embodiment, the pin stay panels 65 are provided as separate members from the first rear suspension member 62 and the second rear suspension member 63 and constitute vulnerable parts of the rear suspension member assembly 61. This allows the pin stay panels 65 of the rear suspension member assembly 61 to buckle first in the event of a rear collision, and the collision impact can be absorbed mainly only by the pin stay panels 65.

Furthermore, according to the automobile 1 of the present embodiment, the bolts 67 used for the first attachment parts 66 constitute vulnerable parts of the rear suspension member assembly 61 next to the pin stay panels 65. This allows the bolts 67 of the rear suspension member assembly 61 to buckle next to the pin stay panels 65 in the event of a rear collision, and the collision impact can be absorbed mainly by the pin stay panels 65 and the bolts.

DESCRIPTION OF REFERENCE NUMERALS

1 Automobile
2 Automobile body
  21 Floor back surface
  22 Dash panel
  23 Front floor panel
  24 Rear floor panel
  25 Sill
  26 Rear floor side member
    261 Bracket
3 Battery frame
  31 Bottom frame
  31A, 31B, 31C, 31D, 31E, 31F Sub-bottom frame
    311 Upper plate
    312 Lower plate
    313 Hollow portion
    314 Rib
  32, 33, 34, 35 Side frame
    321 Rib
  36 Partition plate
  37 Bracket
  38 Cover
  39 Bracket
4 Battery
  41 Battery module
    411 Main surface
    412 Side surface
5 Refrigerant circulator
  51 Flow path
  52 Pump
  53 Cooler
  54 Refrigerant tank
6 Rear suspension
  61 Rear suspension member assembly
  62 First rear suspension member
    621 Front-side attachment part
    622 Rear-side attachment part
  63 Second rear suspension member
    631 Front-side attachment part
    632 Rear-side attachment part
  64 Third rear suspension member
  65 Pin stay panel
  66 First attachment part
  67 Bolt
  68 Nut
  69 Nut plate

The invention claimed is:

1. An automobile comprising:
a battery frame that is attached to a structural member on a floor back of an automobile body and accommodates a battery; and
a rear suspension member assembly that is attached to rear floor side members and supports a rear suspension, wherein
the rear suspension member assembly is attached to the rear floor side members at least at right and left front-side attachment parts and right and left rear-side attachment parts,
the rear suspension member assembly is attached to each of rear end portions of right and left sides of the battery frame at a first attachment part that is closer to a vehicle front than the right and left front-side attachment parts,
the first attachment part is provided on each of members which constitutes a vulnerable part and extends toward the vehicle front from respective front portions of the rear suspension member assembly, and
the member which constitutes the vulnerable part is attached to each of brackets fixed to the rear end portions of the right and left sides of the battery frame.

2. The automobile according to claim 1, wherein the battery frame has right and left side portions that are attached to sills of the automobile body and the rear end portions of the right and left sides that are attached to the rear floor side members.

3. The automobile according to claim 1, wherein the rear suspension member assembly includes a first rear suspension member that suspends a front-side attachment part and a rear-side attachment part on a left side, a second rear suspension member that suspends a front-side attachment part and a rear-side attachment part on a right side, and a third rear suspension member that suspends the first rear suspension member and the second rear suspension member,
the first attachment part is provided on each of pin stay panels extending toward the vehicle front from respective front portions of the first rear suspension member and the second rear suspension member, and
the first attachment part is attached via a bolt and a nut to each of brackets fixed to the rear end portions of the right and left sides of the battery frame.

4. The automobile according to claim 3, wherein the pin stay panels are provided as separate members from the first rear suspension member and the second rear suspension member and constitute vulnerable parts of the rear suspension member assembly.

5. The automobile according to claim 4, wherein the bolt constitutes a vulnerable part of the rear suspension member assembly next to the pin stay panels.

* * * * *